Patented Apr. 25, 1950

2,505,248

UNITED STATES PATENT OFFICE 2,505,248

PROCESS FOR THE PREPARATION OF IMIDAZOLINES

Hans Isler, Bottmingen, and Henri Schellenberg and Ernst Urech, Basel, Switzerland, assignors to Ciba Pharmaceutical Products, Inc.

No Drawing. Application May 21, 1946, Serial No. 671,408. In Switzerland June 6, 1945

3 Claims. (Cl. 260—309.6)

The present invention relates to a process for the preparation of 2-(N-aryl-N-aralkyl-aminoalkyl)-imidazolines. These compounds, as for example 2-(N-phenyl-N-benzyl-aminomethyl)-imidazoline, are active as antiallergic agents.

As set forth in copending U. S. patent application Serial No. 582,189 (now Patent No. 2,449,241, granted September 14, 1948), the said imidazolines may be obtained by reacting a N-aryl-aralkylamine with a reactive ester of a 2-hydroxyalkyl-imidazoline.

It has now been found that the same imidazolines are also obtained if N-aryl-N-aralkyl-amino-alkyl-carboxylic acids or their derivatives are reacted with aliphatic 1,2-diamines.

As derivatives of such acids, the following may for example be used: iminoethers, imidohalogenides, thioamides, thioiminoethers, amides, esters, halogenides and amidines. In so far as these compounds have not been described in the literature, they may be obtained according to known methods. Instead of employing these acid derivatives themselves as the starting materials, the process may be carried out under conditions such that the said derivatives are produced during the course of the reaction. Thus instead of the thioamides, it is especially advantageous to react the corresponding nitriles in the presence of hydrogen sulfide. For this purpose, the hydrogen sulfide can be formed during the course of the reaction from hydrogen sulfide-yielding materials such as carbon disulfide, phosphorus pentasulfide, alkali metal sulfides, ammonium sulfides, iron sulfide or aluminum sulfide, if necessary in the presence of small amounts of water. It is particularly surprising that a substantially smaller quantity of hydrogen sulfide is required than would be necessary for the formation of the thioamide.

Illustrative of the N-aryl-N-aralkyl-aminoalkyl-carboxylic acids which may be employed in the present invention are Phenyl-benzyl-amino-acetic acid;
2-methoxyphenyl-benzyl-amino-acetic acid;
4-methoxyphenyl-benzyl-amino-acetic acid;
2-ethoxyphenyl-benzyl-amino-acetic acid;
4-ethoxyphenyl-benzyl-amino-acetic acid;
Naphthyl-(1)-benzyl-amino-acetic acid;
β-(Phenyl-benzyl-amino)-propionic acid;
Phenyl-phenylethyl-amino-acetic acid;
3-hydroxyphenyl-benzyl-amino-acetic acid;
4-phenoxyphenyl-benzyl-amino-acetic acid;
Naphthyl-(2)-benzyl-amino-acetic acid;
Phenyl-4-chlorobenzyl-amino-acetic acid;
4-chlorophenyl-benzyl-amino-acetic acid;
4-chlorophenyl-4'-chlorobenzyl-amino-acetic acid;
Phenyl-4-methoxybenzyl-amino-acetic acid;
γ-(Phenyl-benzyl-amino)-butyric acid.

Illustrative of the 1,2-diamines which may be employed in the invention are ethylene diamine; N-methyl ethylene diamine; N-ethyl ethylene diamine; N-propyl-ethylene diamine; 1-methylethylene diamine; 1,2-dimethyl ethylene diamine; 1-phenyl ethylene diamine.

The process conditions to be used may vary according to the nature of the reactants employed. Thus, the reaction can be carried out in the presence or absence of diluents and/or condensation agents, at reduced or elevated temperatures and under varying pressures. Furthermore, an excess of one reaction component can be employed; an advantageous embodiment of the process is, for example, that in which an excess of 1,2-diamine is employed in the reaction with a N-aryl-N-aralkyl-amino-alkylcarboxylic acid.

The reaction products are useful as medicaments.

The following specific examples are illustrative of the manner in which the invention may be practiced, the parts being by weight.

Example 1

25.6 parts of phenyl-benzyl-amino-acetothioamide of melting point 168–170° C. (obtained by heating at 120° C. for 4 hours an absolute alcoholic solution of phenyl-benzyl-amino-acetonitrile which has been saturated with ammonia and hydrogen sulfide) are slowly heated to 130° C. with 12 parts of 55% ethylene diamine. As soon as a reaction is observed, the mixture is cooled to 100° C. and a slight vacuum applied in order to suck off the ammonia and hydrogen sulfide which are evolved. As soon as the gas evolution subsides, the mixture is evaporated to complete dryness, cooled, stirred with 200 parts of normal hydrochloric acid and filtered. The filtrate is then made alkaline with ammonia, whereupon an oil precipitates which is taken up in chloroform. By evaporation of the chloroform solution, dried over potassium carbonate, 2-(N-phenyl-N-benzyl-aminomethyl)-imidazoline is obtained. After recrystallization from ethyl acetate, the product melts at 120–121° C.

Example 2

15.3 parts of benzylphenylglycine-thioimidoethylether-dihydrochloride (obtained from phenyl-benzyl-amino-acetonitrile and ethyl mercaptan in chloroform solution by the introduction of 2 molecular equivalents of gaseous hydrochloric acid at −10° C., allowing the mixture to stand for two days and finally precipitating with ether) are added with stirring to a solution, which has been cooled to 0° C., of 2.6 parts of 98% ethylene diamine is 50 parts of absolute alcohol. The reaction mixture is allowed to stand for several hours at 0° C. and then at room temperature. Then the mixture is warmed to 60° C., filtered from the ammonium chloride which is formed, and the filtrate made slightly acid to Congo red and evaporated to dryness. Upon recrystallizing the residue from 80 parts of absolute alcohol, the hydrochloride of 2-(N-phenyl-N-benzyl-aminomethyl)-imidazoline of melting point 227–229° C. is obtained.

Example 3

12 parts of benzylphenylglycine are dissolved in 50 parts of methanol and the solution neutralized with 1.5 parts of ethylene diamine. The solution thus obtained is heated to 230° C. within 1 hour and maintained an additional hour at this temperature with simultaneous drop by drop addition of 20 parts of ethylene diamine. At first, methyl alcohol escapes, then ethylene diamine hydrate and, finally, the fuming ethylene diamine. The yellow honey-like liquid remaining behind is dissolved in absolute alcohol and exactly acidified to Congo red with alcoholic hydrochloric acid. The small amount of ethylene diamine dihydrochloride which precipitates is suction filtered off and the filtrate evaporated to dryness. The crystalline residue is then boiled with 500 parts of water, filtered, the filtrate made alkaline with ammonia and the oil which precipitates taken up in ethylene chloride. After drying and evaporating the ethylene chloride extract, 2-(N-phenyl-N - benzylaminoethyl) - imidazoline is obtained which, dissolved in alcohol and treated with the calculated amount of alcoholic hydrochloric acid, yields the hydrochloride of melting point 227–229° C.

Instead of benzylphenylglycine, it is also possible to use a corresponding ester such as the methyl ester of melting point 57–58° C. obtained with diazomethane. On the other hand, the same end product may be obtained, starting from an acid halide of benzylphenylglycine, by reaction with ethylene diamine.

Instead of reacting benzylphenylglycine or its designated derivatives with ethylene diamine, it is also possible to start with the corresponding intermediately formed acyl compounds and heating these with water splitting agents such as calcium oxide.

Example 4

22.2 parts of phenyl-benzyl-amino-acetonitrile, 7.7 parts of ethylene diamine and 70 parts of alcohol are saturated with hydrogen sulfide, while cooling with ice. The mixture is then slowly heated in a bomb tube to 90 to 100° C. and shaken at that temperature for 2 to 3 hours. After cooling, the solvent is distilled off, finally under reduced pressure. The residue is dissolved in methylene chloride, the solution added with stirring to 220 parts by volume of 0.5 normal hydrochloric acid and the methylene chloride separated. After a short time, the 2-(N-phenyl-N-benzyl-aminomethyl)-imidazoline hydrochloride precipitates from the aqueous solution in the form of colorless crystals which melt at 227–229° C. If the specimen used for determining the melting point is plunged into a bath at 200° C. and quickly heated, the compound melts at 233–235° C.

In the reaction described above, it is not necessary to saturate the mixture with hydrogen sulfide. Use may be made of quantities which are theoretically insufficient to completely convert the nitrile to the thioamide.

Instead of working in a bomb tube, the above described mixture of nitrile, alcohol and ethylene diamine can be heated on a water bath in a flask equipped with a reflux condenser, while passing hydrogen sulfide through the mixture. Instead of ethyl alcohol, other alcohols and other solvents can be employed, such as toluene or xylene, for instance.

The ethylene diamine can be replaced by N-mono-substituted 1,2-diamines in which case compounds substituted at the imidazoline-nitrogen are obtained.

Example 5

0.5 part of hydrogen sulfide is introduced into a solution of 22.2 parts of phenyl-benzyl-aminoacetonitrile and 6.8 parts of ethylene diamine of 98 per cent. strength in 70 parts of alcohol. The solution is gently boiled for 4 hours on the water bath. When the reaction is complete, the product is worked up as indicated in Example 4, the same compound being thus obtained.

Instead of hydrogen sulfide there may also be used equivalent quantities of sodium sulfide and ethylene diamine dihydrochloride.

Example 6

The mixture consisting of 22.2 parts of phenyl-benzyl-aminoacetonitrile with 6.8 parts of ethylene diamine, 0.5 part of carbon disulfide and 70 parts of alcohol is heated for several hours in a bomb tube to 90–100° C. The product is worked up as described in Example 4, 2-(N-phenyl-N-benzyl-aminomethyl)-imidazoline hydrochloride being thus obtained.

Instead of carbon disulphide there may also be used other agents yielding hydrogen sulfide, for example, phosphorus pentasulfide with magnesium oxide and sodium sulfate, containing crystal water, or aluminum sulfide with crystallized sodium sulfate; instead of alcohol, xylene or toluene may be used.

Example 7

27.6 parts of phenyl-benzyl-aminoacetamidine-hydrochloride are heated with 7 parts of ethylene diamine in alcohol on a water bath under a reflux condenser until the ammonia evolution subsides. The solution is neutralized with alcoholic hydrochloric acid, filtered from the small quantity of ethylene diamine dihydrochloride which precipitates and the filtrate cooled to yield 2-(N-phenyl-N-benzyl-aminomethyl)-imidazoline hydrochloride as colorless crystals of melting point 227–229° C.

The phenyl-benzyl-aminoacetamidine-hydrochloride of melting point 165° C. employed as starting material can be obtained, for example, from phenyl-amino-acetamidine - hydrochloride through treatment with benzyl chloride in alcohol.

Example 8

33.8 parts of phenyl-benzyl-glycine-imidoethylether-hydrochloride (obtained from phenyl-benzyl-amino-acetonitrile and ethylalcohol in chloroform by the addition of 2 molecular equivalents of gaseous hydrochloric acid at low temperature, allowing the mass to stand for two days and subsequent precipitation by means of ether) are introduced into a solution of 7.5 parts of ethylene diamine in alcohol which has been cooled to 0° C. The mixture is allowed to stand for several hours at 0° C., then slowly heated to 60° C. The excess ethylene diamine is then neutralized with alcoholic hydrochloric acid. The ammonium chloride and some ethylene diamine-dihydrochloride which have formed are suction filtered off while hot. When the solution is cooling off, the 2 - (N - phenyl - N - benzyl - amino - methyl)-imidazoline-hydrochloride of melting point 227–229° C. crystallizes.

*Example 9*

25.6 parts of phenyl-benzyl-glycine-methyl-ester and 18 parts of ethylene diamine (of 98 per cent. strength) are heated for several hours at 150° C. The temperature is then slowly raised to 200° C. When the distillation of ethylene diamine ceases, the temperature is lowered and 1 molecular equivalent of alcoholic hydrochloric acid is added and the temperature then raised to 250° C. The reaction product is recrystallized from alcohol to obtain the 2-(N-phenyl-N-benzyl-aminomethyl)-imidazoline-hydrochloride of melting point 227–229° C.

Other 2-(N-aryl-N-aralkyl-aminoalkyl)-imidazolines are prepared analogously to the above examples as for example:

2 - [N - (2' - methoxyphenyl) - N - benzyl - aminoethyl] - imidazoline - hydrochloride, melting point 168–169° C.

2 - [N - (4' - methoxyphenyl) - N - benzyl - aminomethyl] - imidazoline - hydrochloride, melting point 206–208° C.

2 - [N - (2' - ethoxyphenyl) - N - benzyl - aminomethyl] - imidazoline - hydrochloride, melting point 187–188° C.

2 - [N - (4' - ethoxyphenyl) - N - benzyl - aminomethyl] - imidazoline - hydrochloride, melting point 216–218° C.

2 - [N - naphthyl - (1') - N - benzyl - aminomethyl] - imidazoline - hydrochloride, melting point 207–209° C.

2 - [N - phenyl - N - benzyl - aminopropyl] - imidazoline-hydrochloride, melting point 193–195° C.

2 - [N - phenyl - N - phenylethyl - aminomethyl]-imidazoline-hydrochloride, melting point 220–222° C.

2 - [N - (3' - hydroxyphenyl) - N - benzyl - aminomethyl] - imidazoline - hydrochloride, melting point 227–228° C.

2 - [N - (4' - phenoxyphenyl) - N - benzyl - aminomethyl] - imidazoline - hydrochloride, melting point 211–213° C.

2 - [N - naphthyl - (2') - N - benzyl - aminomethyl] - imidazoline - hydrochloride, melting point 231–232° C.

2 - [N - phenyl - N - (4' - chlorbenzyl) - aminomethyl] - imidazoline - hydrochloride, melting point 226–227° C.

2 - [N - (4' - chlorophenyl) - N - benzyl - aminomethyl] - imidazoline - hydrochloride, melting point 242–244° C.

2 - [N - (4' - chlorophenyl) - N - (4'' - chlorobenzyl) - aminomethyl] - imidazoline - hydrochloride, melting point 261–264° C.

2 - [N - phenyl - N - (4' - methoxybenzyl) - aminomethyl] - imidazoline - hydrochloride, melting point 211–212° C.

Having disclosed the invention, what is claimed is:

1. A process for the preparation of an imidazoline, which comprises reacting phenyl-benzyl-amino-acetonitrile with ethylene diamine in the presence of a catalytic quantity of carbon disulfide, as H₂S-yielding agent, whereby substantially less sulfur is present than is stoichiometrically required for the formation of the corresponding thioamide.

2. A process for the preparation of an imidazoline, which comprises reacting phenyl-benzyl-amino-acetonitrile with ethylene diamine in the presence of a catalytic quantity of carbon disulfide, as H₂S-yielding agent, and of a diluent, whereby substantially less sulfur is present than is stoichiometrically required for the formation of the corresponding thioamide.

3. A process for the preparation of an imidazoline, which comprises reacting phenyl-benzyl-amino-acetonitrile with ethylene diamine in the presence of a catalytic quantity of carbon disulfide, as H₂S-yielding agent, and in the absence of a diluent, whereby substantially less sulfur is present than is stoichiometrically required for the formation of the corresponding thioamide.

HANS ISLER.
HENRI SCHELLENBERG.
ERNST URECH.

REFERENCES CITED

The following references are of record in the file of this patent:

UNITED STATES PATENTS

| Number | Name | Date |
|---|---|---|
| 2,155,877 | Waldmann et al. | Apr. 25, 1939 |
| 2,201,171 | Hanford | May 21, 1940 |
| 2,252,721 | Meischer et al. | Aug. 19, 1941 |

OTHER REFERENCES

Birechte, vol. 25 (1892) pages 2134–2135.
Beilstein, vol. 9, page 277, citing Cahours, Comptes rendus, vol. 27, page 239.